United States Patent
Trundle

[15] 3,700,338
[45] Oct. 24, 1972

[54] LIGHT SCATTERING CELL
[72] Inventor: Albert S. Trundle, Santa Barbara, Calif.
[73] Assignee: The United States of America as represented by the Secretary of the Army
[22] Filed: June 9, 1970
[21] Appl. No.: 44,835

[52] U.S. Cl. ................................................ 356/246
[51] Int. Cl. ............................................... G01n 1/10
[58] Field of Search ...... 250/218; 356/103, 104, 180, 356/244, 246, 187, 181, 208

[56] References Cited

UNITED STATES PATENTS

| | | | |
|---|---|---|---|
| 3,526,772 | 9/1970 | Troll | 356/180 X |
| 1,994,768 | 3/1935 | Holven et al. | 356/103 X |
| 3,334,537 | 8/1967 | Beattie | 356/104 X |
| 3,074,308 | 1/1963 | Perron et al. | 356/187 |
| 3,557,376 | 1/1971 | Senyk | 356/208 |
| 3,572,946 | 3/1971 | Little | 356/181 |

OTHER PUBLICATIONS

Witnauer et al.: "Cylindrical Light Scattering Cell," The Review of Scientific Instruments, vol. 23, No. 2 Feb. 1952, pages 99 & 100

Casassa et al.: "A Thermostat for Light Scattering Measurements," Journal of Polymer Science, vol. XIV Oct. 1954, pages 385– 389

Primary Examiner—Ronald L. Wibert
Assistant Examiner—F. L. Evans
Attorney—Charles K. Wright, Jr., William G. Gapcynski and Lawrence A. Neureither

[57] ABSTRACT

A light scattering cell for containing liquid samples or particulate samples suspended in a liquid comprising a tube having light entrance and exit apertures with optical surfaces formed from thin transparent disposable film. The entrance aperture is flat and normal to the incident light and the exit aperture is a portion of a cylinder whose axis is normal to the scattering plane and is at the center of the scattering volume.

4 Claims, 3 Drawing Figures

Patented Oct. 24, 1972

3,700,338

INVENTOR.
ALBERT S. TRUNDLE
BY Charles K Wright

ATTORNEY

LIGHT SCATTERING CELL

The invention herein described was made in the course of or under a contract or subcontract thereunder with the Department of the Army.

BACKGROUND OF THE INVENTION

1. Field of the Invention

This invention relates to a sample-containing cell which is part of the optical system of apparatus used in making light scattering measurements. Liquid samples or particulate samples suspended in a liquid may be placed in the cell.

2. Description of the Prior Art

Owing to the necessity of having clean and stainless surfaces for experiments, cells are commonly either permanent requiring thorough cleaning after use, disposable after use, or a combination of the two.

U.S. Pat. No. 2,258,073 discloses a disposable colorimeter cell fabricated from sheet plastic materials and molded spacers. While the expense and time of cleaning are avoided, fabrication expenses are costly and increase with the degree of precision required.

U.S. Pat. No. 3,205,764 discloses a cell with removable hard glass or quartz windows and a removable plastic insert. The outer metal cell housing must be machined to precision tolerances and the windows must be machined to precision optical standards.

The present invention provides a light scattering cell which overcomes the disadvantages of the prior art devices.

SUMMARY OF THE INVENTION

The present invention comprises a cell machined from a length of cylindrical metal tubing or similar material having a light entrance and viewing apertures. The optical surfaces over the apertures are formed from a thin transparent disposable film which is clamped around the outside of the pipe.

It is an object of the invention to provide a light scattering cell with an inexpensive optical surface that may be disposed of when it is scratched or otherwise damaged.

It is a further object of the invention to provide a cell with an optical surface that may be rapidly changed when the need arises.

It is a further object of the invention to provide optical surfaces for a light scattering cell that minimize angular distortion.

It is a still further object of the invention to provide a light scattering cell that minimizes unwanted absorption, refraction and reflection.

DESCRIPTION OF THE PREFERRED EMBODIMENT

Figure 1:
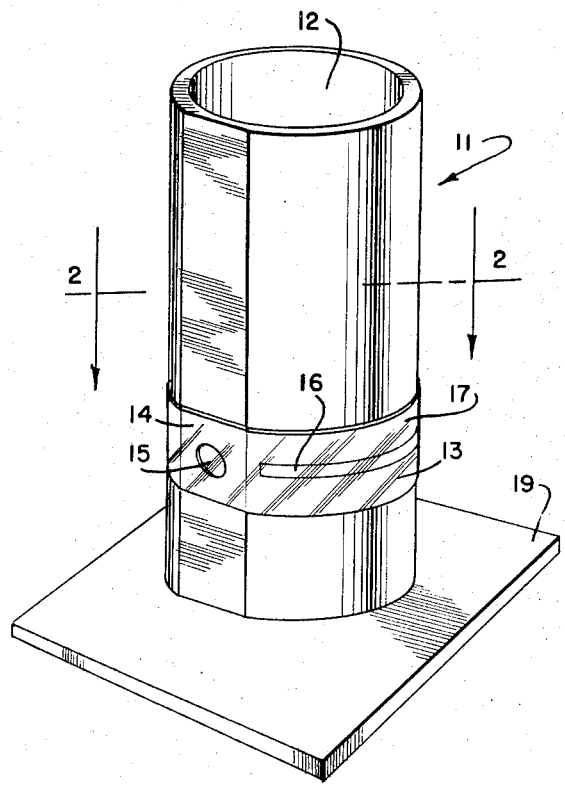
FIG. 1 is a perspective view of the light scattering cell mounted on a base.

The preferred embodiment of the light scattering cell is shown in FIG. 1. The cell 11 has a cylindrical metal body 12. The outside of the cylinder 12 is precision ground to roundness in the light scattering plane area 13. A flat surface 14 is ground tangentially to the cylinder 12 also in the light scattering plane area 13. An aperture 15 is drilled in the flat surface 14 to allow the incident beam of light to enter the cell 11. This aperture 15 defines the location of the light scattering plane area 13. A slot 16 is cut in the round surface of the light scattering plane area 13 to permit viewing the scattered light. The ground surfaces 13, 14 determine the shape of the optical surface which is formed by a piece of thin, flexible, transparent material 17 held tightly against the ground surfaces 13, 14 and cover the aperture 15 and the slot 16. A clamping device 18 is used to hold the transparent film 17 in place. A base 19 is attached to the bottom of the cylinder 12 by brazing or other suitable means.

The transparent film 17 should be capable of forming tightly against the ground surfaces 13, 14 so that the contents of the cell 11 will not leak and so that its surface conforms to the precision ground surfaces of the tube 13, 14. The film 17 should be uniformly thin, between 0.002 and 0.006 inch, and should not stretch. It should have a low coefficient of absorption for the wave lengths of light which are to be used. The film 17 should transmit light without affecting the state of polarization of the light. A plastic material such as mylar or acetate film is suitable.

The entire inner surface of the cell 11, except for the precision ground surfaces, is given a rough surface and is provided with a dull nonreflecting black finish. This finish is important for the inside surface of the cell in the vicinity of the scattering plane and is desirable elsewhere in order to minimize reflections of stray light. The material for the tubing 12 should be selected on the basis of inertness to the solution which it will contain, its dimensional stability, including low coefficient of thermal expansion, and ease of machinery and brazing. The dimensions of the inside of the tube are not critical.

The base 19 may be used as the means for positioning the cell 11 in the measuring apparatus in which case it must be accurately aligned with the cylinder to insure that the entrance window flat area is perpendicular to the incident light beam and that the center of the round exit surface 13 is located at the scattering plane of the apparatus. The cylinder and base may be fabricated as a single piece by a suitable means such as machining from a single piece of metal stock.

The clamping device may be a spring device 18 connected to rigid plastic 20 bonded to each end of the plastic film 17. The spring device may be a fine wire spring, in the form of a ring or a rubber O-ring. Since the pressure on the film typically results from only several inches of fluid, the film to tube interface forms a leakproof seal.

Figure 3:
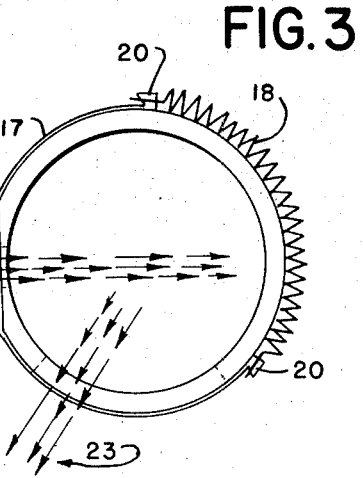
FIG. 3 illustrates the relation of the paths of incident and scattered light.
Figure 2:
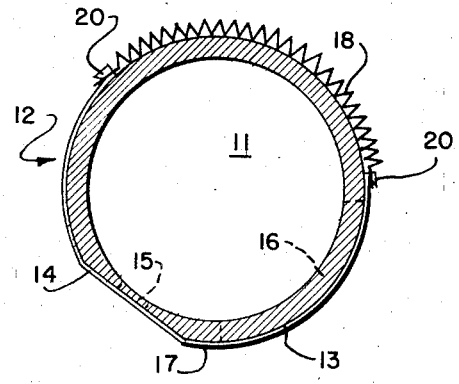
FIG. 2 is a view on the line 2—2 of FIG. 1 showing the film and its clamping means.

The entrance window 15 is located on the flat surface 14 to help insure that the path length of the scattered light which reaches the detector apparatus is always the same. Otherwise errors in measurements will result. FIG. 3 illustrates the relation of the incident light 21 entering the cell 11 and the scattered light 23 emitted from the detector response cone of the cell.

I claim:

1. A light scattering cell comprising:
   a. a cylindrical body having horizontally aligned openings for the entrance and exit of light;

b. a disposable continuous film covering a portion of the circumferential surface of said cylindrical body and forming an optical surface over said openings;

c. clamping means circumferentially disposed on said cylindrical body for securing said film in liquid tight relation over said openings; and d. a base closing one end of said cylindrical body.

2. A light scattering cell comprising:

a. a cylinder having a flat surface ground tangentially to a portion of the outer surface of said cylinder said flat surface having an aperture for light to enter said cell, said cylinder further having a slot arranged for horizontal alignment with said aperture, for viewing the scattered light;

b. a disposable film for forming an optical surface covering said aperture and said slot, wherein each end of said film terminates on a rigid lug;

c. means for circumferentially clamping said film tightly over said aperture and said slot, wherein said clamping means is a resilient member engaging each lug to retain said film in liquid tight relation to the outer surface of said cylinder; and d. a base secured transversely to one end of said cylinder.

3. The light scattering cell recited in claim 2 wherein said cylinder is a length of metal tubing precision ground to roundness internally and externally where said slot is located, the remainder of the interior of said tubing having a rough surface and dull black finish.

4. A light scattering cell as recited in claim 2 wherein the uniform thickness of said film varies from 0.002 to 0.006 inches.

* * * * *